US008833541B2

(12) United States Patent
Aillon et al.

(10) Patent No.: US 8,833,541 B2
(45) Date of Patent: Sep. 16, 2014

(54) SLIDE RETRACT FOR CONVEYOR (71) Applicant: Illinois Tool Works Inc., Glenview, IL (US)

(72) Inventors: Carlos A. Aillon, Stickney, IL (US); Craig R. Scachitti, Elgin, IL (US)

(73) Assignee: Illinois Tool Works Inc., Glenview, IL (US)

( * ) Notice: Subject to any disclaimer, the term of this patent is extended or adjusted under 35 U.S.C. 154(b) by 162 days.

(21) Appl. No.: 13/632,331

(22) Filed: Oct. 1, 2012

(65) Prior Publication Data

US 2014/0090955 A1   Apr. 3, 2014

(51) Int. Cl.
*B65G 47/46* (2006.01)
*B65G 47/71* (2006.01)
*B65G 47/50* (2006.01)

(52) U.S. Cl.
CPC ............... *B65G 47/71* (2013.01); *B65G 47/50* (2013.01)
USPC ........................................ 198/369.1; 198/358

(58) Field of Classification Search
CPC ........ B65G 47/71; B65G 13/10; B65G 13/12; B65G 43/08; B65G 47/50; B65G 47/503
USPC ................ 198/369.1, 358, 349, 735.4, 860.4
See application file for complete search history.

(56) References Cited

U.S. PATENT DOCUMENTS

| 3,647,026 | A * | 3/1972 | Alexander et al. | 186/53 |
| 5,871,078 | A * | 2/1999 | Arnarson et al. | 198/358 |
| 6,227,376 | B1 * | 5/2001 | Handel et al. | 198/369.2 |
| 6,367,609 | B2 * | 4/2002 | Caspi et al. | 198/346.2 |
| 6,725,999 | B2 * | 4/2004 | Luevano | 198/361 |
| 8,002,513 | B2 * | 8/2011 | Malenke et al. | 414/790.5 |
| 2002/0020604 | A1 | 2/2002 | Gaines | |
| 2009/0038453 | A1 | 2/2009 | Malenke et al. | |
| 2009/0038913 | A1 | 2/2009 | Malenke et al. | |
| 2009/0242356 | A1 | 10/2009 | Layne | |
| 2010/0027656 | A1 | 2/2010 | Kadono et al. | |
| 2012/0085686 | A1 | 4/2012 | Radema et al. | |

* cited by examiner

*Primary Examiner* — James R Bidwell
(74) *Attorney, Agent, or Firm* — Nelson Mullins Riley & Scarborough LLP (57) ABSTRACT

A package handling device includes a conveyor, a sensor system and a reject system. The conveyor transports a product along a product handling line. The sensor system is proximate to the conveyor system to determine at least one characteristic of the product for comparison to product acceptance criteria. Failure of the product to meet product acceptance criteria generates a reject signal. The reject system directs the product to a reject bin responsive to the reject signal via a movable assembly that moves a portion of the conveyor to create a gap in the product handling line. The reject system includes a retract slide adjustment bracket that has at least one mounting position to which a selected retraction device is attachable to define a size of the gap based on the selected retraction device and the at least one mounting position limiting a movement range of the movable assembly.

20 Claims, 7 Drawing Sheets

SLIDE RETRACT FOR CONVEYOR

TECHNICAL FIELD

Example embodiments generally relate to conveyor devices and, more particularly, relate to a conveyor device that includes a sensing system and employs a retractable slide for rejecting items when certain criteria are met.

BACKGROUND

In some production based industries, very dynamic product handling environments may be encountered. As an example, in a product packaging environment such as a food packaging environment, products may be moved along a conveyor system after preparation and then packaged and/or inspected. In some embodiments, sensors or various types of examining equipment may be placed at some point along the product handling line (e.g., proximate to products as they pass by on the conveyor system) so that products can be inspected or otherwise examined for compliance with quality control standards, packing standards, or for various other reasons. Products that fail inspection may be removed from the handling line so that they are not shipped to consumers in a deficient condition.

In some systems, responsive to one of the products being identified for rejection (e.g., based on the product failing inspection or failing to meet one or more criteria that are examined by a sensor or other inspection equipment that can inspect products being moved past such equipment on the conveyor belt), a rejection mechanism may operate to remove the identified product from the line. In some cases, the rejection mechanism may have to be carefully designed to accommodate a package or product of a given size. Given the premium on space in many production environments, it may be advantageous to have the rejection mechanism be made of a minimum size necessary to handle the package or product handled on the line. Thus, the equipment is generally engineered to have components sufficient to handle products of the size expected to be encountered in a given environment. However, particularly in cases where different size products are to be handled on the same product handling line, or where a line is to be converted (temporarily or permanently) to handle different products, it may be difficult or very costly to change the rejection mechanism. In some situations, business imperatives may dictate that the difficulty or expense is unavoidable to enable efficient operation of the line.

BRIEF SUMMARY OF SOME EXAMPLES

Some example embodiments may provide an adjustable slide retract mechanism that may be employed for a reject system. The adjustable slide retract mechanism may be utilized to assist in making a transition between package sizes on a product handling line relatively simple so that proper operation of the reject system may be achieved for different sized packages.

In one example embodiment, a package handling device is provided. The package handling device may include a conveyor, a sensor system and a reject system. The conveyor may be configured to transport a product from a first end of the conveyor toward a second end of the conveyor along a product handling line. The sensor system may be disposed proximate to the conveyor system to determine at least one characteristic of the product for comparison of the at least one characteristic to product acceptance criteria. Failure of the product to meet the product acceptance criteria may result in generation of a reject signal. The reject system may be configured to direct the product to a reject bin responsive to the reject signal via operation of a movable assembly that moves at least a portion of the conveyor away from the second end to create a gap in the product handling line. The reject system may include a retract slide adjustment bracket operably coupled to a portion of a frame of the conveyor. The retract slide adjustment bracket may have at least one mounting position to which a selected retraction device is attachable to define a size of the gap based on the selected retraction device and the at least one mounting position limiting a movement range of the movable assembly.

In another example embodiment, a reject system for a package handling device that includes a conveyor and a sensor system is provided. The reject system includes a movable assembly and a retract slide adjustment bracket. The movable assembly is disposed at a portion of a product handling line extending from a first end to a second end of the conveyor. The movable assembly moves at least a portion of the conveyor away from the second end to create a gap in the product handling line responsive to receipt of a reject signal from the sensor system. The reject signal is generated responsive to the sensor system determining that at least one characteristic of a product transported by the conveyor does not meet product acceptance criteria. The retract slide adjustment bracket is operably coupled to a portion of a frame of the conveyor. The retract slide adjustment bracket has at least one mounting position to which a selected retraction device is attachable to define a size of the gap based on the selected retraction device and the at least one mounting position limiting a movement range of the movable assembly.

Some example embodiments may improve the performance of product handling equipment and, in particular, the reject system of product handling equipment employing an example embodiment.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

FIG. 6, which includes FIG. 7, which includes

DETAILED DESCRIPTION

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other.

Some example embodiments may improve the ability of operators to make relatively quick and easy adjustments to a reject system used on a product handling line. In this regard, for example, rather than requiring machine re-tooling or major equipment modifications, a relatively simple adjustment to components that define the size of a gap through which rejected products pass may be accomplished to reconfigure a product handling line. Accordingly, product handling line down time, cost and complexity for conversion from handling one package size to handling another may be reduced.

Figure 1:
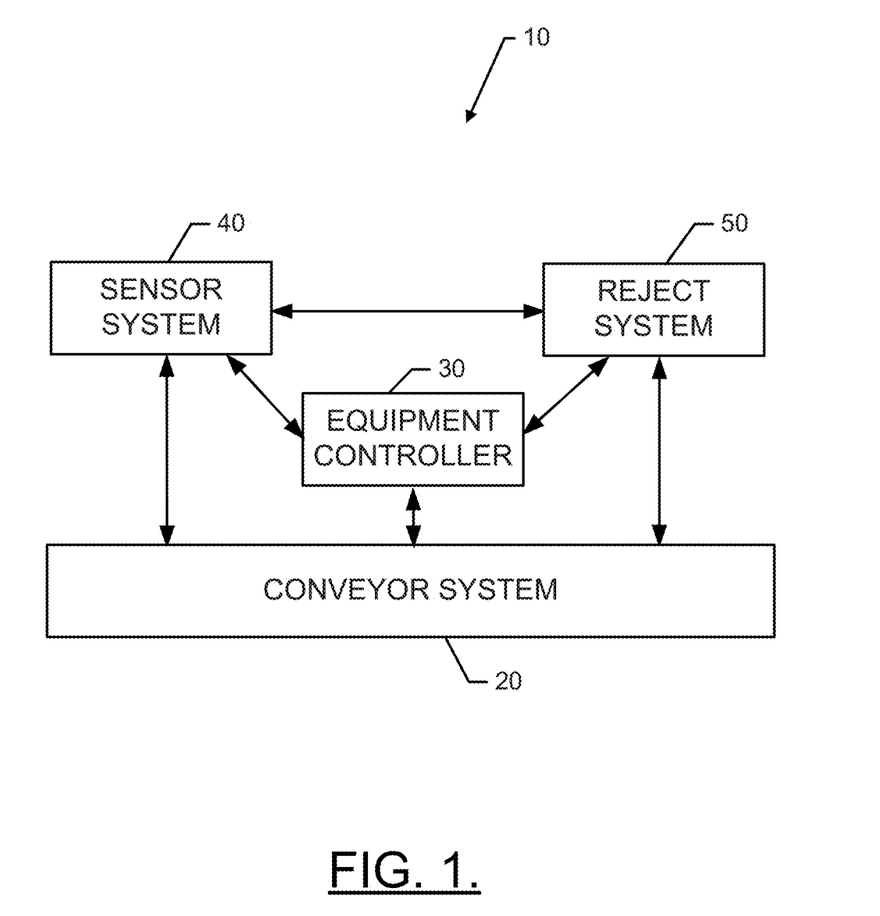
FIG. 1 illustrates a functional block diagram of product handling equipment including a reject system according to an example embodiment.

FIG. 1 illustrates a functional block diagram of product handling equipment including a reject system according to an example embodiment. As shown in FIG. 1, the product handling equipment 10 may include a conveyor system 20. They conveyor system 20 may include a structure for supporting a conveyor belt, or a series of rollers (some or all of which may be powered rollers) to support a product and enable movement of the product from one end of the product handling equipment 10 to the other end thereof responsive to powered operation of the conveyor system 20. In some cases, the conveyor system 20 of the product handling equipment 10 may be in operable communication with conveyor systems of other equipment to define a product handling line over which one or more packing and/or processing tasks may be conducted relative to the product being transported by the conveyor system 20. However, in some embodiments, the product handling equipment 10 may form a beginning, end or the entirety of the product handling line.

The belt and/or rollers of the conveyor system 20 may be powered responsive to control by one or more motors (e.g., electric motors) that may be controlled by equipment controller 30. The equipment controller 30 may include basic power control for the motors including on/off controls and, in some cases, speed control or other more sophisticated operational control features. One or more products may sit on the belt or rollers and, responsive to operation of the one or more motors, the products may be moved along the product handling line so that any number of operations may be performed on the products (e.g., preparation, handling, packaging, inspection, and/or the like).

In an example embodiment, the product handling equipment 10 may further include a sensor system 40 that is configured to perform a sensing operation with respect to a product being transported by the conveyor system 20. In some embodiments, the sensor system 40 may operate to detect one or more characteristics of the product while the product is moving on the conveyor system 20. However, in other embodiments, the sensor system 40 may operate when the product is stopped proximate to the sensor system 40. Thus, for example, the sensor system 40 may operate under the control of the equipment controller 30 or receive operational signaling from the equipment controller 30 to enable the sensor system 40 to perform its sensing operation when the product is appropriately located to enable the operation to be completed.

In some embodiments, the sensor system 40 may include multiple sensors for detection of respective different characteristics of the product. However, inclusion of multiple sensors is not required. In embodiments where multiple sensors are employed, one sensor may be used to detect product presence, location and/or size (e.g., using a camera, one or more light sensors and/or the like). When the product is detected at a particular location, the sensor system 40 may then employ another sensor to detect some other characteristic of the product (e.g., weight, temperature, metal content, visual characteristics, internal product defects, and/or the like). As such, for example, the sensor system 40 may include one or more of a scale, an x-ray machine, a metal detector, a camera, and/or the like.

In an example embodiment, when a product is inspected by the sensor system 40, the sensor system 40 will operate to detect one or more characteristics of the product and compare the one or more characteristics detected to acceptance criteria. The acceptance criteria may define criteria for accepting and/or rejecting the product. Thus, for example, the acceptance criteria may define specific characteristics that should be detected, or that should not be detected. In some cases, the acceptance criteria may define ranges of acceptable characteristics (e.g., weight ranges). If the acceptance criteria are not met, the sensor system 40 may generate a reject signal to indicate that a corresponding product is to be rejected or removed from the conveyor system 20.

In some embodiments, the product handling equipment 10 may further include a reject system 50 that is configured to eject or otherwise remove selected products (i.e., products that do not meet acceptance criteria and therefore which have a reject signal associated therewith) from the conveyor system 20. The reject system 50 may be in communication with the sensor system 40 and/or the equipment controller 30 to receive the reject signal and may operate to remove or eject the product from the conveyor system 20.

In some embodiments, the reject system 50 may include structural components that push, pluck, tip or otherwise force the selected product off of the conveyor system 20 and into a reject bin forming a portion of the reject system 50. However, in an example embodiment, the reject system 50 may interact with the conveyor system 20 to move a portion of the conveyor system 50 in order to create a gap in the path that the product would otherwise travel on the conveyor system 20 (i.e., a gap in the product handling line). The product may continue to be moved along the conveyor system 20 (e.g., by the rollers and/or conveyor belt) and may therefore fall into the reject bin when the gap is encountered. In some embodiments, the reject bin may be positioned under a portion of the conveyor belt or rollers of the conveyor system 20 so that when the conveyor system 20 moves to create the gap, the product can simply fall down into the reject bin. Products in the reject bin may be destroyed, recycled, refurbished, repackaged, or otherwise treated so that they will potentially pass inspection by the sensor system 30 when passed through the product handling equipment 10 in the future.

In some embodiments, the reject system 50 may operate to reject a product by moving a portion of the conveyor system 20 as mentioned above. In this regard, for example, one or more rollers of the conveyor system 20 may be mounted to a movable assembly. The movable assembly may then operated responsive to receipt of the reject signal to move the one or more rollers and create the gap in the product handling line. The movable assembly may move responsive to operation of a pneumatic or electromechanical driver to create the gap. In some embodiments, the movable assembly may move a fixed distance responsive to receipt of the reject signal in order to create a gap of a corresponding known or fixed size. However, the movable assembly may be structured so that one of a plurality of different fixed distances may be relatively easily configured (e.g., based on product size). In this regard, for example, the movable assembly may be configured to include a plurality of selectable mounting locations so that the movable assembly can be mounted to the conveyor system 20 with any one of various different predefined movement distances configured for the movable assembly to define the gap size. In one embodiment, the predefined movement distances may be adjusted by adjusting the size and mounting position of a selected retraction device (e.g., a pneumatic cylinder). Alternatively, the predefined movement distances may be adjusted by inserting a selected adapter bracket size between a fixed mounting position and the selected retraction device. Accordingly, for example, the movable assembly may be configured in order to achieve a desired fixed distance for the gap size.

Figure 2:
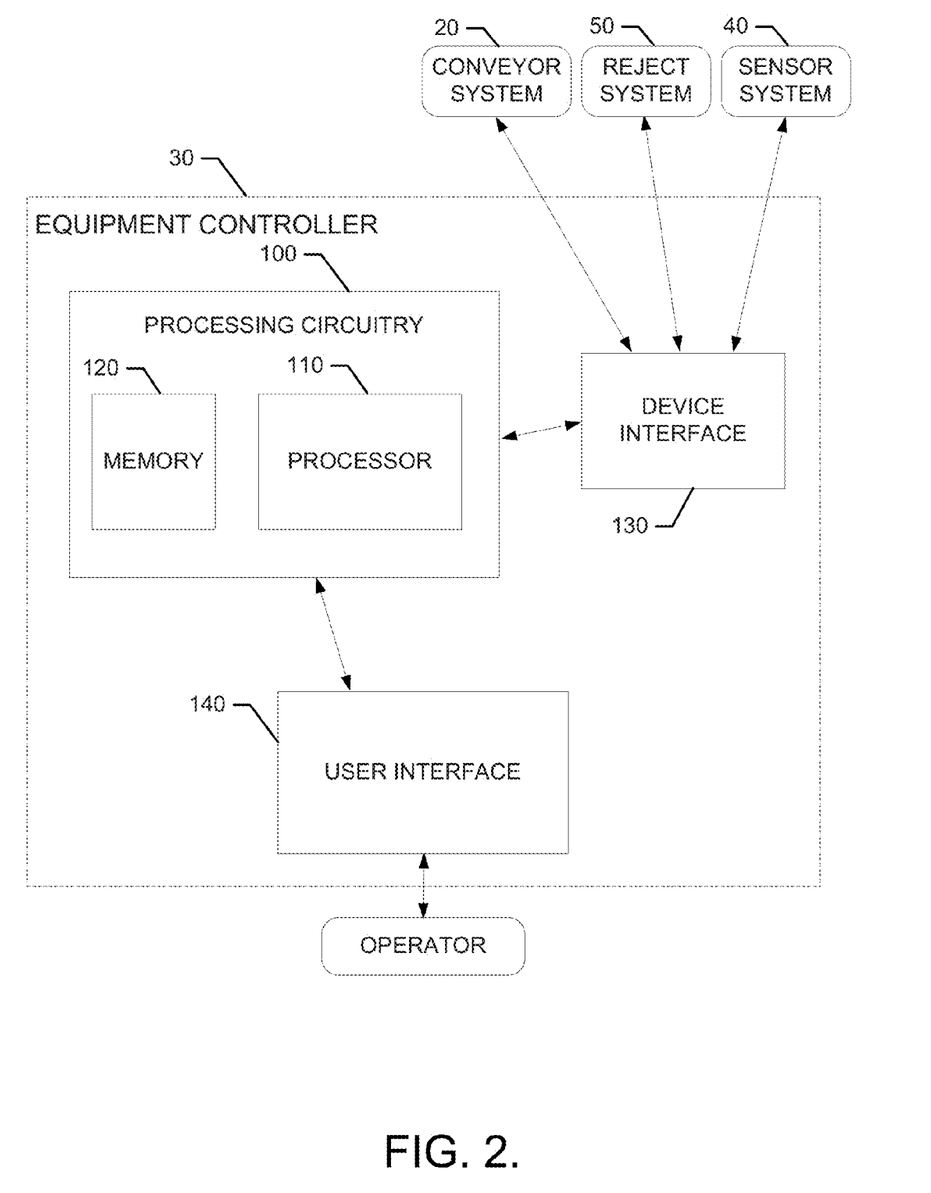
FIG. 2 illustrates a block diagram of control circuitry of the product handling equipment of FIG. 1 according to an example embodiment.

FIG. 2 illustrates a block diagram of the equipment controller 30 of the product handling equipment of FIG. 1 according to an example embodiment. In some embodiments, the equipment controller 30 may include or otherwise be in communication with processing circuitry 100 that is configurable to perform actions in accordance with example embodiments described herein. As such, for example, the functions attributable to the equipment controller 30 may be carried out by the processing circuitry 100.

The processing circuitry 100 may be configured to perform data processing, control function execution and/or other processing and management services according to an example embodiment of the present invention. In some embodiments, the processing circuitry 100 may be embodied as a chip or chip set. In other words, the processing circuitry 100 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The processing circuitry 100 may therefore, in some cases, be configured to implement an embodiment of the present invention on a single chip or as a single "system on a chip." As such, in some cases, a chip or chipset may constitute means for performing one or more operations for providing the functionalities described herein.

In an example embodiment, the processing circuitry 100 may include a processor 110 and memory 120 that may be in communication with or otherwise control a device interface 130 and, a user interface 140. As such, the processing circuitry 100 may be embodied as a circuit chip (e.g., an integrated circuit chip) configured (e.g., with hardware, software or a combination of hardware and software) to perform operations described herein. However, in some embodiments, the processing circuitry 100 may be embodied as a portion of an on-board computer.

The user interface 140 may be in communication with the processing circuitry 100 to receive an indication of a user input at the user interface 140 and/or to provide an audible, visual, mechanical or other output to the user (or operator). As such, the user interface 140 may include, for example, a display (e.g., a touch screen), one or more hard or soft buttons or keys, and/or other input/output mechanisms. In some embodiments, the user interface 140 may be provided on a front panel (e.g., positioned on or proximate to a portion of the sensor system 40) of the product handling equipment 10.

The device interface 130 may include one or more interface mechanisms for enabling communication with other devices such as, for example, one or more sensors of a sensor network (e.g., sensor system 40), components of the reject system 50, components of the conveyor system 20, and/or external devices. In some cases, the device interface 130 may be any means such as a device or circuitry embodied in either hardware, or a combination of hardware and software that is configured to receive and/or transmit data from/to sensors that measure any of a plurality of product parameters/characteristics such as weight, temperature, metal content, visual characteristics, internal product defects, and/or the like. In some cases, the device interface 130 may enable the processing circuitry 100 to communicate with motor controllers, power distribution circuits and/or the like to facilitate operation of the product handling equipment 10. Alternatively or additionally, the device interface 130 may provide interface mechanisms for any devices capable of wired or wireless communication with the processing circuitry 100 (e.g., an external machine controller, monitoring equipment, and/or the like).

In an exemplary embodiment, the memory 120 may include one or more non-transitory memory devices such as, for example, volatile and/or non-volatile memory that may be either fixed or removable. The memory 120 may be configured to store information, data, applications, instructions or the like for enabling the equipment controller 30 to carry out various functions in accordance with exemplary embodiments of the present invention. For example, the memory 120 could be configured to buffer input data for processing by the processor 110. Additionally or alternatively, the memory 120 could be configured to store instructions for execution by the processor 110. As yet another alternative, the memory 120 may include one or more databases that may store a variety of data sets (e.g., for acceptance criteria), applications, and/or the like to facilitate operation of the equipment controller 30. Among the contents of the memory 120, applications may be stored for execution by the processor 110 in order to carry out the functionality associated with each respective application. In some cases, the applications may include control applications that utilize parametric data to control the operation of the sensor system 40, the conveyor system 20 and/or the reject system 50 as described herein. In this regard, for example, the applications may include operational guidelines defining a plurality of sets of instructions for operation of the product handling equipment 10.

The processor 110 may be embodied in a number of different ways. For example, the processor 110 may be embodied as various processing means such as one or more of a microprocessor or other processing element, a coprocessor, a controller or various other computing or processing devices including integrated circuits such as, for example, an ASIC (application specific integrated circuit), an FPGA (field programmable gate array), or the like. In an example embodiment, the processor 110 may be configured to execute instructions stored in the memory 120 or otherwise accessible to the processor 110. As such, whether configured by hardware or by a combination of hardware and software, the processor 110 may represent an entity (e.g., physically embodied in circuitry—in the form of processing circuitry 100) capable of performing operations according to embodiments of the present invention while configured accordingly. Thus, for example, when the processor 110 is embodied as an ASIC, FPGA or the like, the processor 110 may be specifically configured hardware for conducting the operations described herein. Alternatively, as another example, when the processor 110 is embodied as an executor of software instructions, the instructions may specifically configure the processor 110 to perform the operations described herein.

In an example embodiment, the processor 110 (or the processing circuitry 100) may be embodied as, include or otherwise control the equipment controller 30. As such, in some embodiments, the processor 110 (or the processing circuitry 100) may be said to cause each of the operations described in connection with the equipment controller 30 by directing the equipment controller 30 to undertake the corresponding functionalities responsive to execution of instructions or algorithms configuring the processor 110 (or processing circuitry 100) accordingly. As an example, the equipment controller 30 may be configured to control operation of the product handling equipment 10 based on sensed data and/or user input at the user interface 140.

Figure 3:
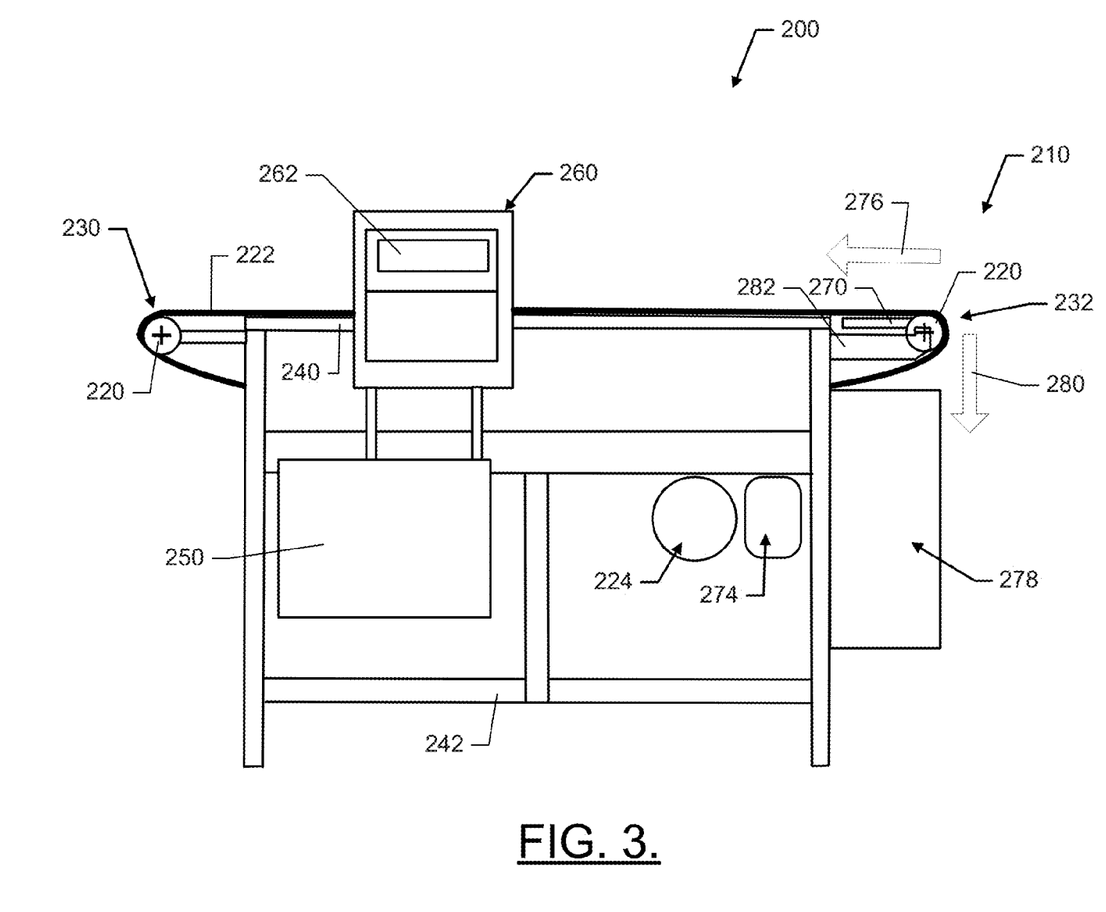
FIG. 3 illustrates a front view of a product handling conveyor system employing a reject system according to an example embodiment.
Figure 4:
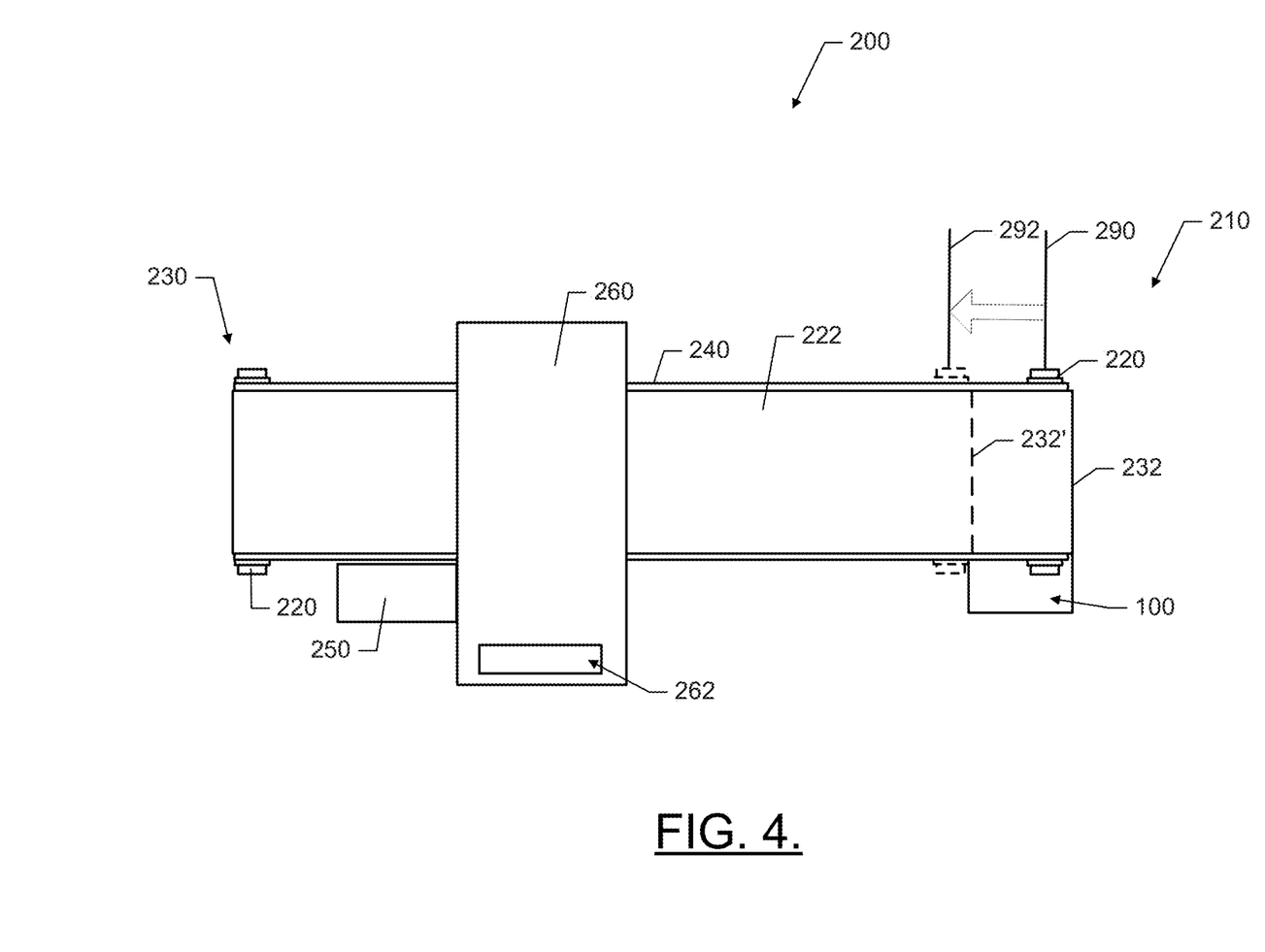
FIG. 4 illustrates a top view of the conveyor system of FIG. 1 according to an example embodiment.

FIG. 3 illustrates a front view of a product handling conveyor system 200 employing a reject system 210 according to an example embodiment. FIG. 4 illustrates a top view of the product handling conveyor system 200. The product handling conveyor system 200 may be an example of the product handling equipment 10 of FIG. 1, and the reject system 210 may be an example of the reject system 50 of FIG. 1. As shown in FIGS. 3 and 4, the product handling conveyor system 200 may include rollers 220 that may engage a conveyor belt 222, which may together form portions of the conveyor system 20 of FIG. 1.

In an example embodiment, a motor 224 may be provided to be operably coupled to one or more of the rollers 220 (or other powered rollers that are not shown) to move the conveyor belt 222. The movement of the rollers 220 may be translated to the conveyor belt 222 to cause corresponding movement of the conveyor belt 222. Thus, it should be appreciated that the rollers 220 need not necessarily be provided at the ends of the product handling line. Instead, the rollers 220 may be disposed at interior portions of the conveyor system 20. In an example embodiment, the conveyor belt 222 may generally operate so that a product that is placed (by whatever means) on the conveyor belt at a first end 230 of the product handling conveyor system 200 is transported toward a second end 232 of the product handling conveyor system 200.

The conveyor belt 222 may ride over a support table 240 that may be affixed to a frame 242. A power panel 250 may be affixed to a portion of the frame 242 to house one or more components of for controlling operation of the product handling conveyor system 200 (e.g., equipment controller 30, sensor system 40, conveyor system 20 or eject system 50 components). In this regard, for example, some of the processing circuitry 100, power distribution circuitry, motor control circuitry and/or other electrical components for controlling the product handling conveyor system 200 may be housed in the power panel 250. In an example embodiment, the power panel 250 may be operably coupled to a sensor housing 260, which may house an embodiment of the sensor system 40 of FIG. 1.

The sensor housing 260 may extend over (e.g., in a transverse direction) all or a portion of the conveyor belt 222 so that a product being transported on the conveyor belt 222 may be inspected or otherwise examined using equipment of the sensor system 40 housed in the sensor housing 260. In some embodiments, the sensor housing 260 may also house control circuitry for the sensor system 40, which may be embodied as the processing circuitry 100 of FIG. 2, or other circuitry capable of communication with the processing circuitry 100. Accordingly, for example, the sensor housing 260 may include a display 262, which may form a portion of the user interface 140. The display 262 may be a touch screen display so that instructions, settings and/or other use inputs may be provided thereat.

Figure 5:
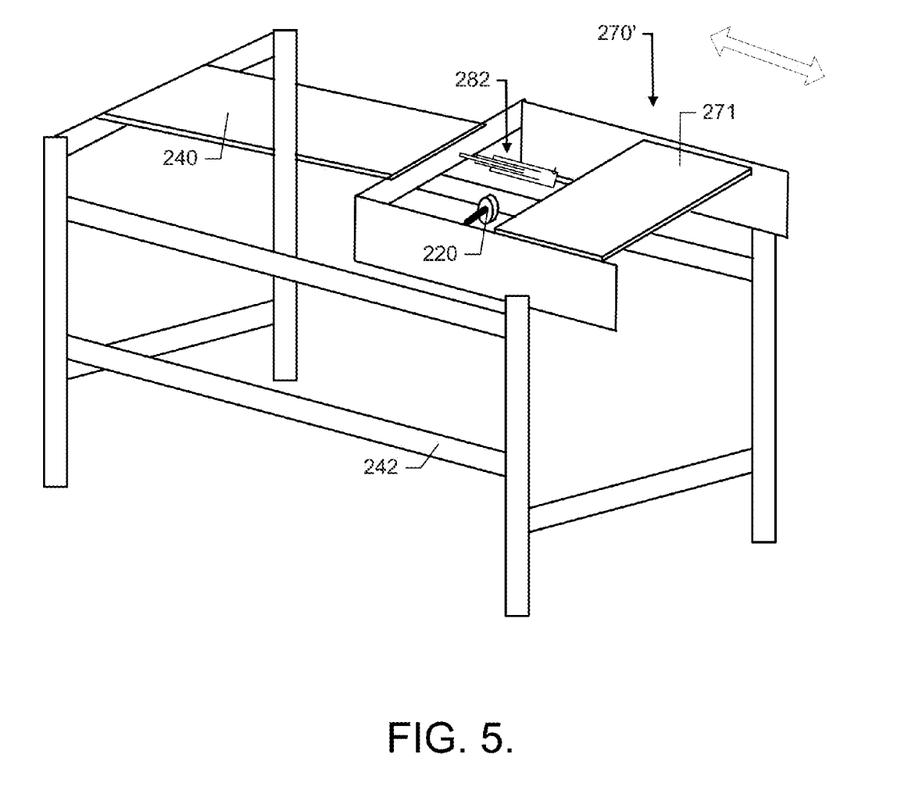
FIG. 5 provides an example structure for a movable assembly including a carriage that does not include any rollers according to an example embodiment.

In an example embodiment, the end of the support table 240 that is proximate to the second end 232 may include a void space into which the reject system 210 may be at least partially provided (e.g., see FIG. 5). The reject system 210, or at least some components thereof, may be mounted within the void space and may include at least one part that is retractable in order to create the gap. In one example, the reject system 210 may be retractable at one of a plurality of selectable distances based on the operation of a movable assembly 270. The movable assembly 270 may be a carriage that is mounted to ride within a portion of the frame 242 in order to be retractable responsive to operation of a pneumatic cylinder that extends and contracts based on pneumatic inputs provided from a pressurized tank 274. In this regard, for example, when the sensor system 40 detects a defective product, the reject signal may be generated by the processing circuitry 100 and pressurized air may be released from the pressurized tank 274 to cause operation of the pneumatic cylinder to cause retraction of the movable assembly 270 in the direction shown by arrow 276. The product, which may be conveying toward the second end 232, may then drop into a reject bin 278 as shown by arrow 280.

The movable assembly 270 may be operably connected to at least one of the rollers 220 to move the roller and the carriage (supporting a portion of the conveyor belt 222) at least partially in the direction shown by arrow 276 to create the gap in the product handling line as described above. However, in other embodiments, the movable assembly 270 may not include any rollers 220, but may simply provide a surface (i.e., the carriage) over which the conveyor belt 222 may ride. FIG. 5 provides an example structure for a movable assembly 270' that may include a carriage 271 that does not include any rollers. In an example embodiment, the movable assembly 270 may include or be operably coupled to a pneumatic cylinder that extends or contracts to create the gap responsive to provision of pressurized air to one side of a piston disposed in the pneumatic cylinder. The extension and contraction of the pneumatic cylinder may push the movable assembly 270 away from the first end 230 or draw the movable assembly 270 in the direction shown by arrow 276, respectively, to create the gap.

In an example embodiment, the movable assembly 270 may be mounted to retract relative to a retract slide adjustment bracket 282 that may have one or more fixed mounting positions. The retract slide adjustment bracket 282 may be mounted to the frame 242 and/or the support table 240 at a fixed location, but may allow a selected retraction device (e.g., a selected size of pneumatic cylinder) to attach between the movable assembly and a selected one of the fixed mounting positions to define the distance the movable assembly 270 may travel when retracted (i.e., when the retraction device operates responsive to the reject signal).

As an alternative, the retract slide adjustment bracket 282 may not employ the multiple fixed mounting positions, but may instead only include one mounting position. However, a mounting adapter may be provided between the single mounting position of the retract slide adjustment bracket 282 and the pneumatic cylinder to define the distance to be traveled by the movable assembly 270 responsive to operation of the pneumatic cylinder when the reject signal is received.

Thus, in one example embodiment, the movable assembly 270 may be configured to move a selected distance (e.g., such that the roller 220 is displaced from a first position 290 to a second position 292) based on a selected mounting position and corresponding selected pneumatic cylinder size. However, in an alternative embodiment, the moveable assembly 270 may be configured to move the selected distance based on a selected mounting adapter size of a mounting adapter disposed between a corresponding selected pneumatic cylinder size and a single, fixed mounting position on the retract slide adjustment bracket 282. In either case, the second end 232 may be essentially shifted to a new location (shown by dashed line 232' in FIG. 4) that is closer to the first end 230.

Figure 6A:
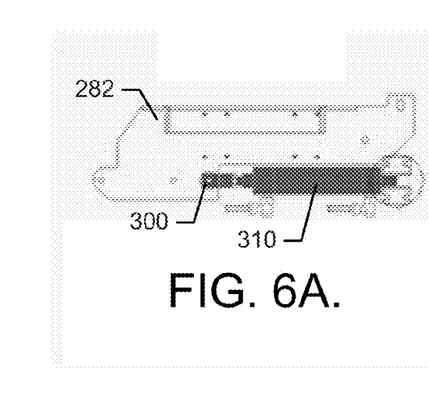
FIGS. 6A, 6B and 6C, shows three separate example setups for a retract slide adjustment bracket having multiple mounting positions according to an example embodiment.
Figure 6B:
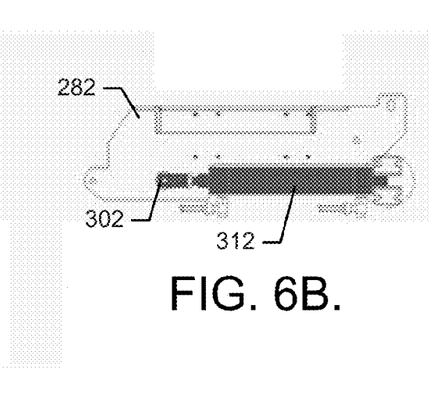
Figure 6C:
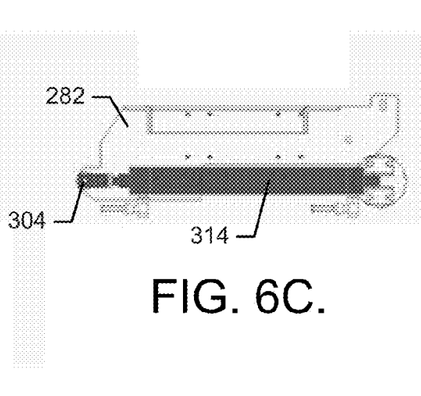

FIG. 6, which includes FIGS. 6A, 6B and 6C, shows three separate example setups for the retract slide adjustment bracket 282. In this regard, for example, FIG. 6A illustrates a setup for creation of a relatively small gap (e.g., 4 inches) responsive to receipt of a reject signal, FIG. 6B illustrates a setup for a relatively medium sized gap (e.g., 6 inches) responsive to receipt of a reject signal, and FIG. 6C illustrates a setup for a relatively larger sized gap (e.g., 10 inches) responsive to receipt of a reject signal.

As can be seen in FIG. 6, the adjustable bracket 282 has three mounting positions including a first mounting position 300, a second mounting position 302 and a third mounting position 304. The adjustable bracket 282 is attached to the frame 242 at a selected one of the mounting positions in order to define the amount of extension of the adjustable bracket 282 toward the second end 232. In this regard, in the example of FIG. 6A, the adjustable bracket 282 is fixed to the frame 242 at the first mounting position 300 so that there is a limited amount of extension of the adjustable bracket 282 from the first mounting position 300 toward the second end 232. Meanwhile, in the example of FIG. 6B, the adjustable bracket 282 is fixed to the frame 242 at the second mounting position 302 so that there is more extension of the adjustable bracket 282 from the second mounting position 302 toward the second end 232 than that which was provided in the example of FIG. 6A. Likewise, in the example of FIG. 6C, the adjustable bracket 282 is fixed to the frame 242 at the third mounting position 304 so that there is even more extension of the adjustable bracket 282 from the third mounting position 304 toward the second end 232 than that which was provided in the examples of FIG. 6A and FIG. 6B.

A first pneumatic cylinder 310 (with about a 4 inch range of extension) may be fitted between the first mounting position 300 and the movable assembly 270 to define about a 4 inch movement of the moveable assembly 270 when the first pneumatic cylinder 310 operates to create the gap (again of about 4 inches). If the example of FIG. 6B is employed, a second pneumatic cylinder 312 (with about a 6 inch range of extension) may be fitted between the second mounting position 302 and the movable assembly 270 to define about a 6 inch movement of the moveable assembly 270 when the second pneumatic cylinder 312 operates to create the gap (again of about 6 inches). If the example of FIG. 6C is employed, a third pneumatic cylinder 314 (with about a 10 inch range of extension) may be fitted between the third mounting position 304 and the movable assembly 270 to define about a 10 inch movement of the moveable assembly 270 when the third pneumatic cylinder 314 operates to create the gap (again of about 10 inches).

Figure 7A:
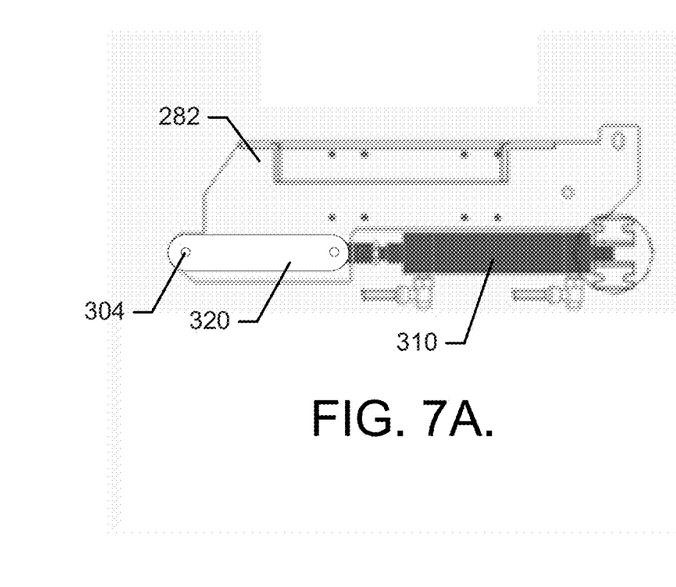
FIGS. 7A and 7B, shows two example setups for a retract slide adjustment bracket having only a single mounting position according to an example embodiment.
Figure 7B:
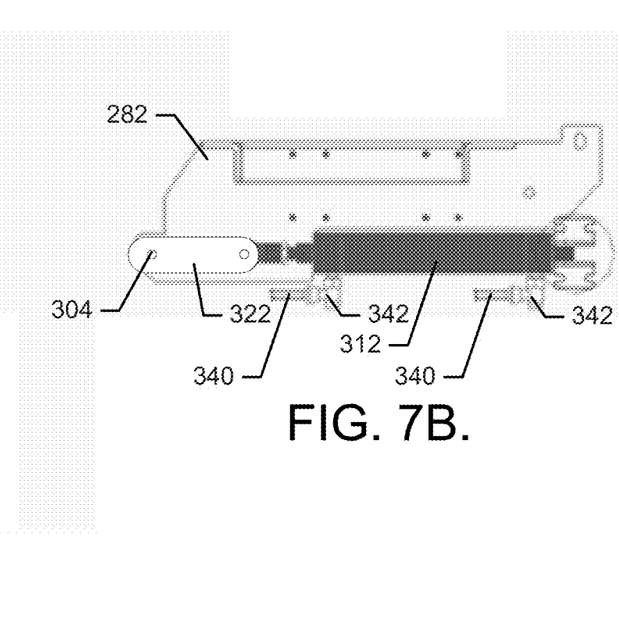

In an alternative embodiment to the example of FIG. 6, a mounting adapter may be used as is shown, for example, in FIGS. 7A and 7B. For example, a relatively large size (i.e., the third mounting position 304) of the adjustable bracket 282 may be employed, or a fixed bracket having only one (relatively large) predetermined distance between the mounting position and the end of the bracket may be affixed to the frame 242. Then, to adjust between different gap sizes, a different mounting adapter may be selected to be placed between the pneumatic cylinder and a mounting surface. As an example, to achieve a 4 inch gap, the first pneumatic cylinder 310 may be employed, and an extension bracket 320 may be provided to bridge the gap between the pneumatic cylinder and the third mounting position 304 (see FIG. 7A). Meanwhile, if a larger cylinder is employed in order to achieve a 6 inch gap (e.g., the second pneumatic cylinder 312), then a smaller extension bracket 322 may be used as a mounting adapter to bridge the smaller gap between the pneumatic cylinder and the third mounting position 304 (see FIG. 7B). Finally, if an even larger cylinder is employed to achieve a 10 inch gap (e.g., the third pneumatic cylinder 314), then no extension bracket may be needed.

In an example embodiment, the size of the product that is being processed may determine the needed size of gap to permit removal of products to the reject bin 278 responsive to generation of the reject signal. For example, a package 6 inches long and 1 inch high may require a slide retraction distance of at least 4 inches to permit the package to be ejected to the reject bin 278. Accordingly, the example embodiment of FIG. 6A or 7A may be employed to accommodate the package size and an operator may easily position the bracket (e.g., adjustable bracket 282 or a fixed bracket with an extension) to fix the movable assembly 270 to a slide retraction distance of 4 inches. Meanwhile, for example, if the package size is adjusted to a 12 inch package that is 3 inches high, a minimum gap size of 8 inches may be required to permit the package to be rejected to the reject bin 278. The operator may simply change the pneumatic cylinder to a larger size and either remove any extension or reposition the adjustable bracket 282 to the corresponding mounting position for use with the larger cylinder size.

Of note, in some embodiments, the speed of actuation of a pneumatic cylinder may be controlled by controlling the rate of providing air into and out of the pneumatic cylinder. By way of example, air lines 340 shown in FIG. 7B may provide air into and out of the second pneumatic cylinder 312. One or more valves upstream/downstream of the portion of the air lines 340 shown on FIG. 7B may be adjusted to control the rate of air provision, or valves 342 of FIG. 7B may be adjusted to control the rate. The operator may provide input for control of the rate of air provision, or the equipment controller 30 may make such determination based on information provided thereto or predetermined criteria.

Some embodiments may therefore enable a size of a gap in a product handling line to be generated based on the size of an adjustable member used in connection with creating the gap. In some cases, the gap may be generated by moving a carriage supporting a portion of the line in a first direction, while the product is moved simultaneously in a second direction that is opposite to the first direction. The size of the product being handled may be used to determine the size of bracket to be used to support creation of the gap and/or the size of a pneumatic cylinder that is used to create the gap.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. A package handling device comprising:
   a conveyor configured to transport a product from a first end of the conveyor toward a second end of the conveyor along a product handling line;
   a sensor system disposed proximate to the conveyor to determine at least one characteristic of the product for comparison of the at least one characteristic to product acceptance criteria, wherein failure of the product to meet the product acceptance criteria results in generation of a reject signal;
   a reject system configured to direct the product to a reject bin responsive to the reject signal via operation of a movable assembly that moves at least a portion of the conveyor away from the second end to create a gap in the product handling line,
   wherein the reject system comprises a retract slide adjustment bracket operably coupled to a portion of a frame of the conveyor, the retract slide adjustment bracket having at least one mounting position to which a selected retraction device is attachable to define a size of the gap based on the selected retraction device and the at least one mounting position limiting a movement range of the movable assembly.

2. The device of claim 1, wherein the selected retraction device is operably coupled between the at least one mounting position and the movable assembly to retract to draw the movable assembly away from the second end to create the gap.

3. The device of claim 2, wherein the retract slide adjustment bracket comprises a plurality of mounting positions to which the selected retraction device is mountable.

4. The device of claim 3, wherein each of the mounting positions defines a different distance from a respective one of the mounting positions to the second end of the conveyor.

5. The device of claim 3, wherein the selected retraction device comprises a pneumatic cylinder of a size corresponding to the size of the gap.

6. The device of claim 2, wherein the retract slide adjustment bracket comprises a single fixed mounting position to which the selected retraction device is mountable.

7. The device of claim 6, wherein the reject system further comprises an adapter bracket disposable between the single fixed mounting position and the selected retraction device, the adapter bracket having one of a plurality of selectable sizes, each of the selectable sizes defining a different distance from an end of the adapter bracket to the second end of the conveyor.

8. The device of claim 1, wherein the selected retraction device comprises a pneumatic cylinder and wherein rate of operation of the pneumatic cylinder is adjustable by controlling a rate of provision of air to or from the pneumatic cylinder.

9. The device of claim 1, wherein movement of the conveyor causes the product to be directed into the rejection bin via the gap.

10. The device of claim 1, wherein the size of the gap is based on a size of the product.

11. A reject system for a package handling device that includes a conveyor and a sensor system, the reject system comprising:
    a movable assembly disposed at a portion of a product handling line extending from a first end to a second end of the conveyor, the movable assembly moving at least a portion of the conveyor away from the second end to create a gap in the product handling line responsive to receipt of a reject signal from the sensor system, the reject signal being generated responsive to the sensor system determining that at least one characteristic of a product transported by the conveyor does not meet product acceptance criteria; and
    a retract slide adjustment bracket operably coupled to a portion of a frame of the conveyor, the retract slide adjustment bracket having at least one mounting position to which a selected retraction device is attachable to define a size of the gap based on the selected retraction device and the at least one mounting position limiting a movement range of the movable assembly.

12. The reject system of claim 11, wherein the selected retraction device is operably coupled between the at least one mounting position and the movable assembly to retract to draw the movable assembly away from the second end to create the gap.

13. The reject system of claim 12, wherein the retract slide adjustment bracket comprises a plurality of mounting positions to which the selected retraction device is mountable.

14. The reject system of claim 13, wherein each of the mounting positions defines a different distance from a respective one of the mounting positions to the second end of the conveyor.

15. The reject system of claim 13, wherein the selected retraction device comprises a pneumatic cylinder of a size corresponding to the size of the gap.

16. The reject system of claim 12, wherein the retract slide adjustment bracket comprises a single fixed mounting position to which the selected retraction device is mountable.

17. The reject system of claim 16, further comprising an adapter bracket disposable between the single fixed mounting position and the selected retraction device, the adapter bracket having one of a plurality of selectable sizes, each of the selectable sizes defining a different distance from an end of the adapter bracket to the second end of the conveyor.

18. The reject system of claim 11, wherein the selected retraction device comprises a pneumatic cylinder and wherein rate of operation of the pneumatic cylinder is adjustable by controlling a rate of provision of air to or from the pneumatic cylinder.

19. The reject system of claim 11, wherein movement of the conveyor causes the product to be directed into the rejection bin via the gap.

20. The reject system of claim 11, wherein the size of the gap is based on a size of the product.

* * * * *